(12) United States Patent
Nohmi

(10) Patent No.: US 7,394,422 B2
(45) Date of Patent: Jul. 1, 2008

(54) INTERFEROMETER-TYPE RADAR

(75) Inventor: Hitoshi Nohmi, Tokyo (JP)

(73) Assignee: NEC Corporation, Tokyo (JP)

( * ) Notice: Subject to any disclaimer, the term of this patent is extended or adjusted under 35 U.S.C. 154(b) by 213 days.

(21) Appl. No.: 11/303,942

(22) Filed: Dec. 19, 2005

(65) Prior Publication Data

US 2006/0220946 A1  Oct. 5, 2006

(30) Foreign Application Priority Data

Dec. 24, 2004 (JP) ............................. 2004-374181

(51) Int. Cl.
*G01S 13/42* (2006.01)
(52) U.S. Cl. .................. 342/107; 342/108; 342/113; 342/156; 342/189; 342/196
(58) Field of Classification Search .............. 342/90, 342/95–97, 107–116, 133, 139, 146, 147, 342/156, 192, 196, 417, 424
See application file for complete search history.

(56) References Cited

U.S. PATENT DOCUMENTS

| | | | | |
|---|---|---|---|---|
| 5,818,383 A * | 10/1998 | Stockburger et al. | ........ | 342/109 |
| 6,104,336 A * | 8/2000 | Curran et al. | .................. | 342/70 |
| 6,738,563 B1 * | 5/2004 | Hager et al. | ................ | 342/147 |
| 7,312,745 B2 * | 12/2007 | Ishii et al. | .................... | 342/109 |
| 2003/0210177 A1 * | 11/2003 | Hager et al. | ................. | 342/147 |
| 2005/0156780 A1 * | 7/2005 | Bonthron et al. | ............ | 342/107 |
| 2006/0220946 A1 * | 10/2006 | Nohmi | ....................... | 342/107 |
| 2006/0220949 A1 * | 10/2006 | Nohmi | ....................... | 342/160 |
| 2006/0262007 A1 * | 11/2006 | Bonthron et al. | .............. | 342/70 |

FOREIGN PATENT DOCUMENTS

| | | |
|---|---|---|
| JP | 2000-46941 | 2/2000 |
| JP | 2003-177175 | 6/2003 |

* cited by examiner

*Primary Examiner*—John B Sotomayor
(74) *Attorney, Agent, or Firm*—McGinn IP Law Group, PLLC

(57) ABSTRACT

A transmitter for transmitting signals to targets and a receiver for receiving signals reflected from targets are included. The transmitter outputs CW signals for detecting direction and velocity of the target. The receiver performs: a function of receiving signals reflected from targets with a plurality of receiving antennas at the same time as transmitting from the transmitter, and performing spectral analysis with respect to receiving signals to thereby classify them by velocity component; a function of correlating signals of the receiving antenna systems; a function of integrating the signals correlation-processed; and a function of obtaining phase fronts of signals made incident on an antenna face from the phase differences of signals between receiving antennas, and performing two-dimensional FFT to the outputs to thereby measure the direction and velocity of the target.

11 Claims, 9 Drawing Sheets

FIG. 4
(a)
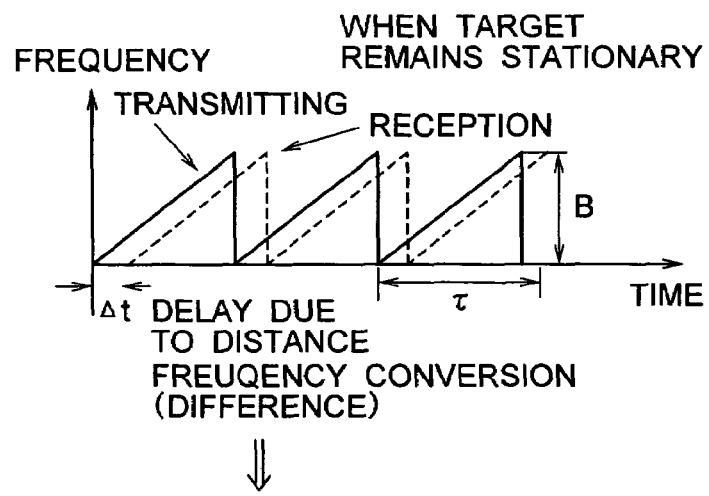
(b)
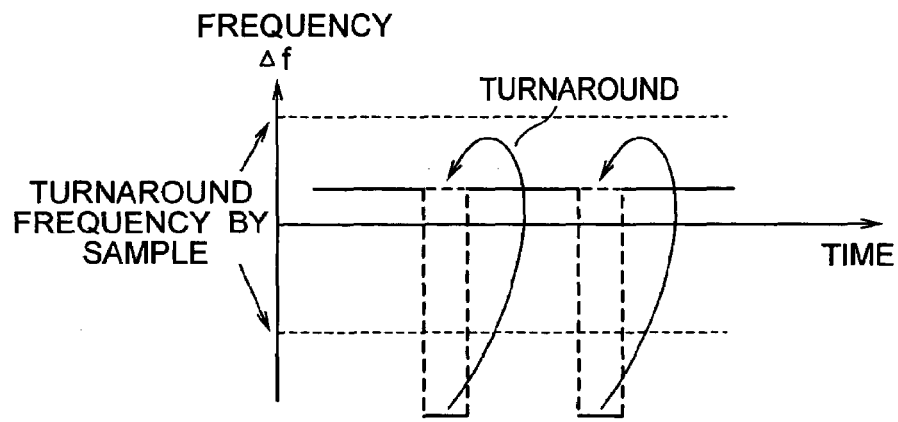
(c)
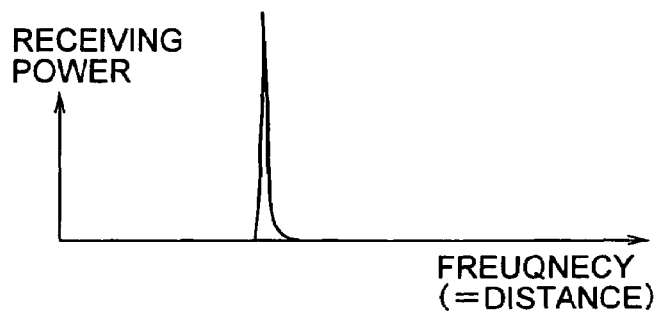

FIG. 5
(a)
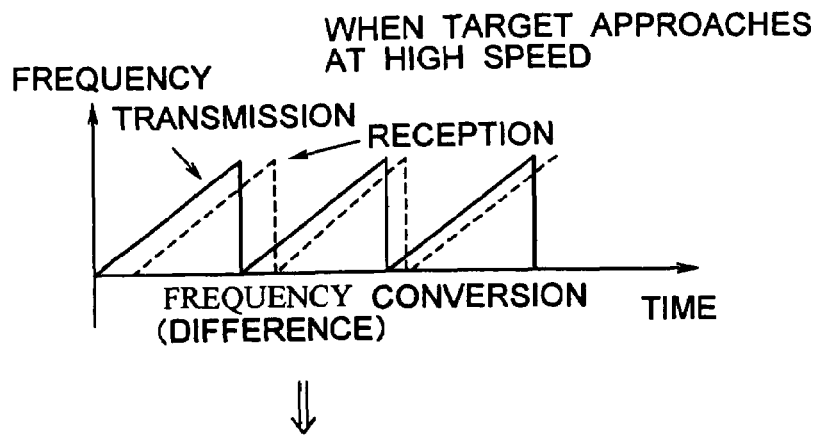
(b)
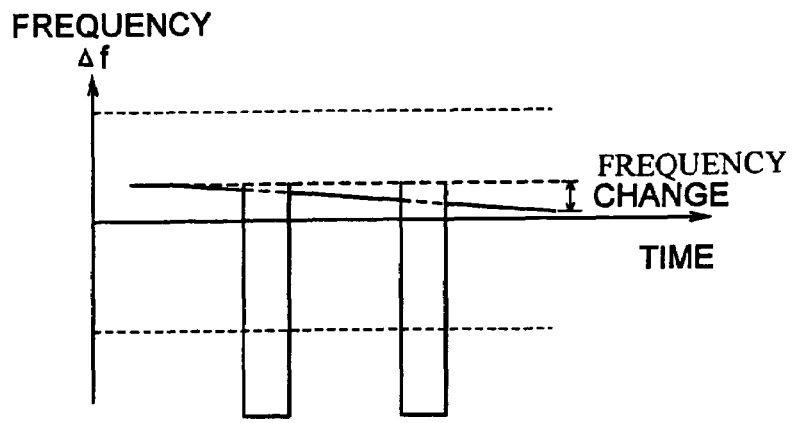
(c)
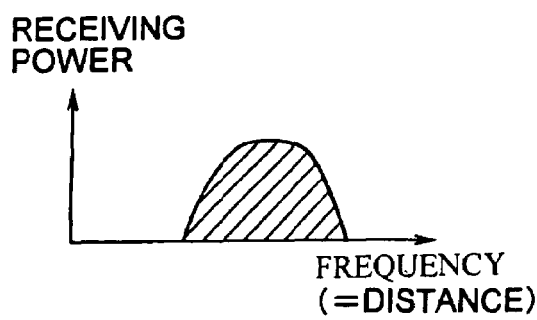

- TARGET POSITION INFORMATION IS 3D DISPLAYED WITHIN BEAM
- TARGET VELOCITY AND TRAVEL DIRECTION INFORMATION ARE DISPLAYED IN VECTOR REPRESENTATION
- TARGET ORBIT INFORMATION IS DISPLAYED WITH BROKEN LINES

MTI, RANGING MODE DISPLAY IMAGE (a)

AIRCRAFT IMAGE EXAMPLE

ISAR DISPLAY IMAGE (b)

INTERFEROMETER-TYPE RADAR

BACKGROUND OF THE INVENTION

1. Field of the Invention

The present invention relates to an interferometer-type radar which observes a flying target.

2. Related Art

A conventional radar uses a very narrow beam antenna so as to know the direction of the target. In order to observe a wide area with the narrow beam width, it is required to scan the antenna at a high speed. In a case of searching a potential target, a certain time period is required from the time a specific direction is scanned to the time the same direction is scanned again, so a target which appeared suddenly may be overlooked.

In the conventional radar, a distance is measured with a delay time until a transmitting signal is reflected from a target and received. In order to improve the distance resolution, the transmitting pulse width must be reduced, which causes a decrease in the transmitting average power, an expansion of the receiving bandwidth, and a drop of S/N. Therefore, there is a case where a target, in which the radar cross section area for reflecting the transmitting signal is small, cannot be found.

In the conventional pulse radar, a Doppler frequency shift of a reflection signal is generally used for measuring the velocity of the target. In order to measure the velocity of a high speed moving target, the pulse repetition frequency should be twice as large as the Doppler frequency. In a case that the target is a flying object moving at an extremely high speed such as a missile, the receiving time window becomes extremely small, whereby ambiguity is caused in the distance measurement. In order to prevent this problem, it has been required to calculate the distance to the target by performing analytical processing using plural pulse repetition frequencies.

A conventional phased array radar forms a multi-beams, and by using these beams, tracks a plurality of targets independently. However, since there is a limit in the number of beams capable to be divided, the number of target which can be tracked is limited.

As a method of obtaining the distance to the target and the velocity of the target by using a means other than a pulse radar, there is one using an FMCW radar. In a conventional FMCW radar, the velocity of the target is detected from the Doppler shift component of the baseband frequency in the frequency ascending time and the frequency descending time of a FMCW signal, and the distance to the target is obtained by correcting the Doppler component. (see, for example, Japanese Patent Application Laid-open No. 2000-46941 and Japanese Patent Application Laid-open No. 2003-177175).

However, when the target is moving, there is a problem that a baseband signal, which is a frequency-converted receiving signal by a transmitting signal, is affected by a Doppler shift due to the velocity of the target, and at the same time, the frequency changes according to the movement of the target, whereby it is impossible to measure the distance accurately. Further, if the velocity and a change in the velocity of the target are large, or if there are a number of targets of different velocities at the same time, it is difficult to apply the above-mentioned method.

Further, in the conventional FMCW radar, an influence of delay is disregarded by taking a repetition cycle which is much larger than a delay due to the distance. Therefore, when measuring a long distance, there is a problem that a fast repetition cycle cannot be adopted, whereby it is difficult to measure the distance to a target moving at a high speed with higher accuracy.

SUMMARY OF THE INVENTION

It is therefore an object of the present invention to provide an interferometer-type radar capable of using transmitting modules designed not for a radar but for general communications, in which CW signals or FMCW signals are used as transmitting signals instead of pulses, which is different from a typical radar.

In order to achieve the object, an interferometer-type radar according to the present invention comprises: a transmitter for transmitting signals to a target; and a receiver for receiving reflection signals reflected from the target. The transmitter outputs CW signals for detecting the direction and the velocity of the target in the MTI mode, and outputs FMCW signals for detecting the direction and the distance of the target in the ranging mode and in the ISAR mode, from transmitting antennas respectively. The receiver which receives reflection signal from the target with a plurality of receiving antennas during the transmitting simultaneously, performs three different processing modes with respect to receiving signals, and performs velocity measurement, direction measurement, instant distance measurement, orbit estimation, and shape imaging of an unknown target. In the MTI mode, the receiver performs spectral analysis of baseband signals to thereby classify them by velocity of the target, and further performs high-accuracy velocity measurement of the specific target. In the ranging mode, the receiver performs spectral analysis after frequency-converting the receiving signals with FMCW signals which are same as transmitting signals, and classifies them by distance of the target. Further, in the high-accuracy ranging processing of the specific target, the receiver performs velocity correction processing for high-accuracy ranging after performing frequency-conversion with FMCW the same as the case of ranging mode, and performs distance measurement with high accuracy. In the ISAR mode, the receiver performs ISAR image processing of the specific target. Among these three modes, in coarse processing in the MTI mode and the ranging mode, the receiver performs correlation processing with respect to spectral analysis outputs of the respective receiving antenna systems, integrates the signals which are correlation-processed, and performs processing of two-dimensional FFT.

Further, the transmitter transmits signals which is phase locked to reference signals, and outputs reference signals to the receiver. The receiver performs frequency-conversion to the received signal by using the phase locked signal with reference signals, and performs spectral analysis processing, correlation processing and integration processing.

Further, the transmitter transmits FMCW signals as transmitting signals, and the receiver frequency-converts the receiving signals with the FMCW signals the same as the transmitting signals, and converts distance information of the target into frequency information. Further, the transmitter transmits FMCW signals as transmitting signals, and the receiver frequency-converts the receiving signals with the FMCW signals the same as the transmitting signals, and after performing distance correction of the specific target by using velocity information of the specific target obtained in the MTI mode, converts distance information of the target to frequency information so as to obtain distance information with high accuracy. Further, the transmitter transmits FMCW signals as transmitting signals, and the receiver frequency-converts the receiving signals with the FMCW signals the same as the transmitting signals, and performs ISAR processing.

Further, the transmitter transmits CW signals as transmitting signals, and the receiver performs spectral analysis of baseband signals of the CW signals received, and obtains the velocity of the target.

In the transmitter, a plurality of transmitting antennas are aligned in matrix, and transmitting signals, in which the beam width and the beam direction thereof are adjusted by phase shifters, are outputted from the transmitter. In the receiver, a plurality of receiving antennas are aligned in a T shape, and the spatial resolution is determined by the dimension of the T shape.

Further, an image display unit is included. The image display unit images outputted images from the receiver by overlapping them to thereby display the direction, the distance and the velocity of the target, the high-accuracy distance to the target at an instant time, and an ISAR image of the target, by combining them.

In order to increase the accuracy of distance for a high speed target, the repetition frequency and band width of FMCW is increased. In order to process receiving signal energy of reflection signals from long distance effectively, A/D conversion frequency should be equal to the product of the repetition cycle and frequency change rate. Thereby, a base-band frequency of the frequency-converted receiving signal components far exceeding the A/D converting frequency are converted to the same processing frequency during the ascending and descending due to the turnaround characteristics of digital signals, whereby all receiving signal energy is processed effectively.

EFFECTS OF THE INVENTION

In the present invention, transmitting signals are not pulses but CW or FMCW signals, which is different from a typical radar, so it is possible to use transmitting modules for general communications not for a radar. Therefore, it is possible to easily realize low price and high reliability. Further, since CW or FMCW is used, S/N ratio is improved by long-hour integration, whereby transmitting power required for imaging may be significantly smaller comparing with a conventional radar. Further, it is possible to realize much higher sensitivity than a conventional radar. Therefore, a small size and low price can be realized.

An interferometer-type radar device has been realized in the astronomical field for observing stars and the sun. In such systems, the device detects slight energy generated by a target itself, and creates a radiation map. In these systems, it has not been necessary to measure distance to the target. On the other hand, in order to monitor missiles or aircrafts, not only velocity but also distance is very important information. Further, energy emitted from an aircraft or a missile itself is unknown, so it is not used for imaging.

On the other hand, in the present invention, electromagnetic wave energy required for imaging is emitted from a transmitter. Since FMCW signals are used as transmitting signals, distance information can be obtained by converting distance information to frequency information. A target in the whole illuminating area can be imaged for every certain time, without scanning the beam of the transmitting antenna.

Further, since CW signals are used as transmitting signals, it is possible to obtain the velocity of the target easily by analyzing spectrum of baseband signals. The velocity resolution is determined depending on the Doppler frequency resolution, and determined by the number of data of FFT. Even for a target moving at a very high speed such as a missile or an ICBM, it is possible to obtain the resolution easily by analyzing with FFT of the Doppler frequency.

In a conventional FMCW radar, it was difficult to range a target moving at a high speed with high sensitivity and high accuracy. However, in the high-accuracy ranging mode of the present invention, by correcting receiving data and performing time integration within a range where a target is seemed to perform uniform linear motion, by using velocity data of the target obtained in the MTI mode, it is possible to perform distance measurement with high sensitivity and high accuracy the same as a pulse radar.

The transmitter is composed of a plurality of small transmitting modules, and by adjusting phase shifters, it is possible to easily change the beam from a pencil beam to a broad beam. It is possible to concentrate the transmitting power in a specific target direction, to improve S/N ratio of receiving signals, and to perform imaging by ISAR processing.

BRIEF DESCRIPTION OF THE DRAWINGS

FIGS. 4(a), 4(b) and 4(c) are charts showing a case where a target stops;

FIGS. 5(a), 5(b) and 5(c) are charts showing a case where a target is approaching;

DESCRIPTION OF PREFERRED EMBODIMENT

Hereinafter, the present invention will be explained in detail based on the drawings.

Figure 1:
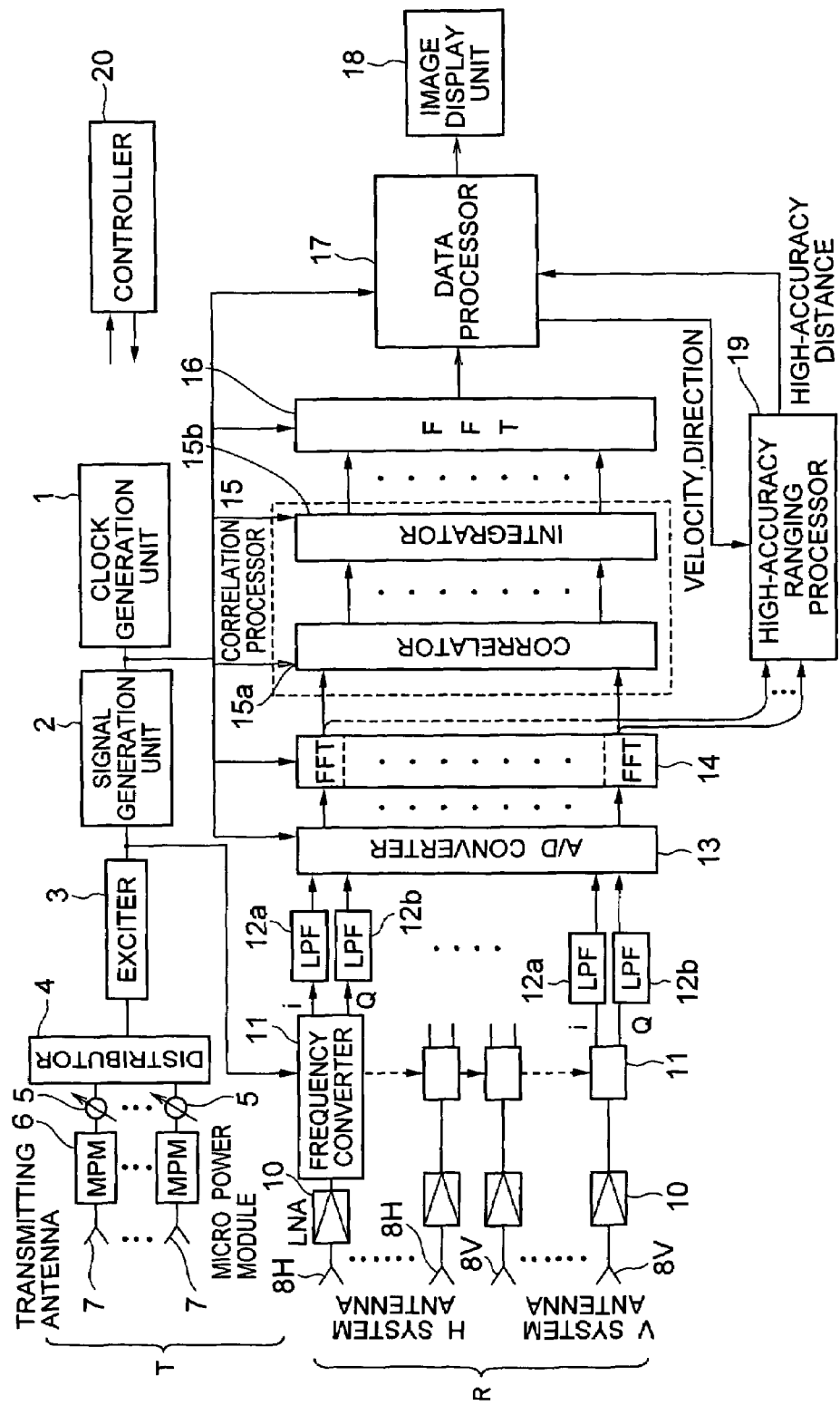
FIG. 1 is a block diagram showing the configuration of an interferometer-type radar according to the present invention.

As shown in FIG. 1, an interferometer-type radar according to the embodiment of the present invention includes: a transmitter T consisting of a plurality of transmitting modules; and a plurality of receivers R.

When viewed from the operational side, the interferometer-type radar according to the embodiment of the present invention shown in FIG. 1 has two operational modes, that is, a passive mode and an active mode. The active mode includes a ranging mode, an MTI mode, a high-accuracy ranging mode and an ISAR mode. Each mode will be explained.

The passive mode is an operational mode in which directions and radio signal intensity of all radio signal sources in a receivable frequency range within receiving antenna beams, such as signals of a meteorological radar of an aircraft, an FCS radar of a fighter, and a radar mounted on a satellite, are displayed without emitting radio signals (transmitting signals) to a target.

Among the active modes, the ranging mode and the MTI mode operate alternatively in a time sharing manner, measure the direction and distance of a target, synthesize the measurement results and display it on the screen. Further, in the ranging mode and the MTI mode, a coarse MTI function for observing all views completely and instantaneously and an precise ranging function for performing ranging MTI of a specific target with high accuracy, and a coarse ranging function for observing all views completely and instantaneously and an precise ranging function for performing ranging of a specific target with high accuracy, operate at the same time. The measurement results of the coarse MTI function, the coarse ranging function, the precise MTI function and the precise ranging function are image-processed, synthesized on the overall display, or displayed as detailed information of an individual target. The ISAR mode is one in which radio waves (transmitting signals) are transmitted when operated and reflection signals are received, whereby ISAR (inverse synthetic aperture radar) processing is performed so as to create the image.

As shown in FIG. 1, the transmitter T consists of a plurality of modules. The plurality of modules include: a clock generation unit 1, a signal generation unit 2, an exciter 3, a signal distributor 4, a plurality of phase shifters 5 to which signals distributed by the signal distributor 4 are inputted respectively, and a plurality of micro power modules (MPM) 6, each of which is connected to each of the phase shifters 5, and a plurality of transmitting antennas 7 for radiating transmitting signal from the respective micro power modules 6. The micro power module (MPM) 6 incorporates a small TWTA (traveling wave tube amplifier) having a phase stabilizing circuit not shown, and amplifies the transmitting signals. Further, the exciter 3 increases the amplitude of the transmitting signals from the signal generation unit 2, and outputs them to the signal distributor 4.

Figure 2:
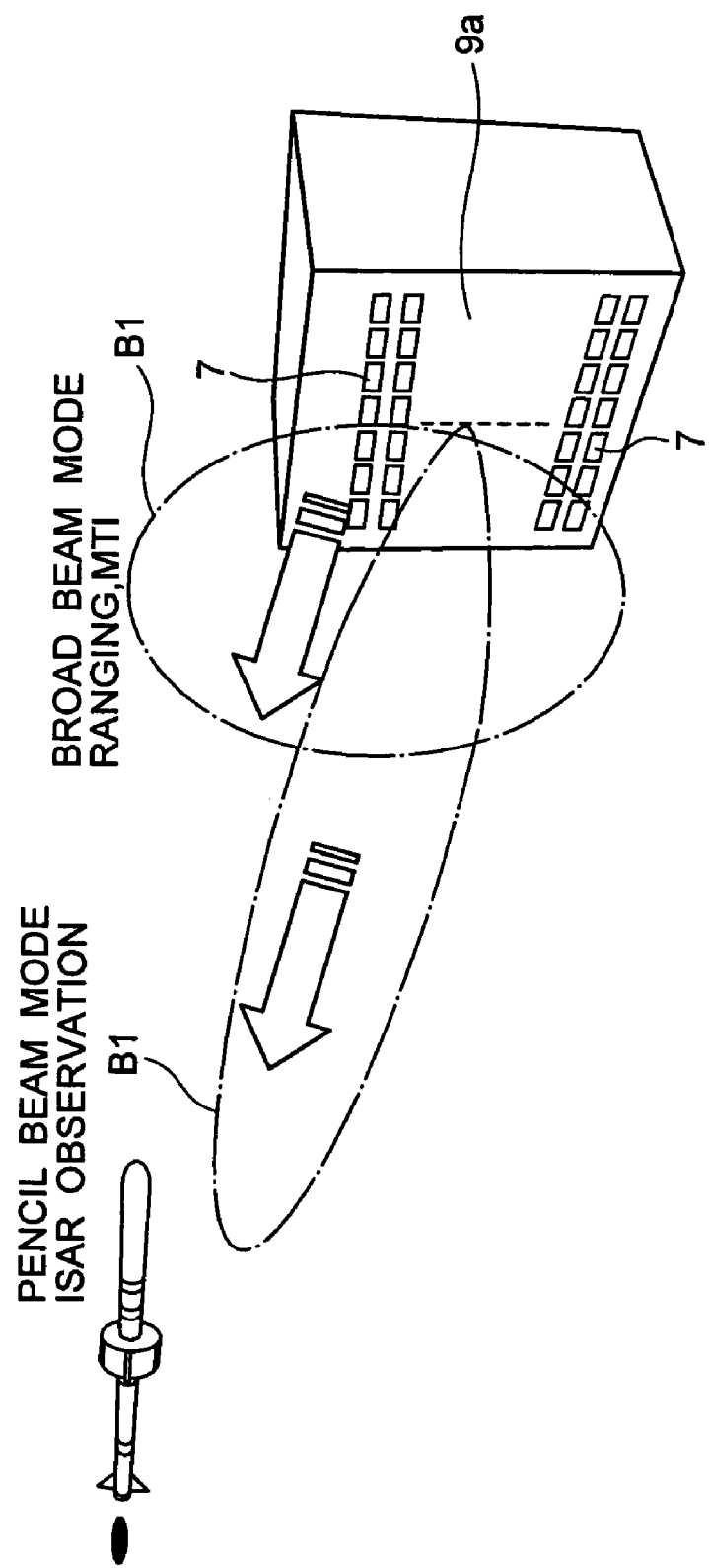
FIG. 2 is a diagram showing the configuration of transmitting antennas installed in a transmitter of the interferometer-type radar according to the present invention.

As shown in FIG. 2, the transmitting antennas 7 are aligned in a matrix on an antenna face 9a. The antenna face 9a is in a planar shape in which the normal direction thereof faces a target 21. Note that the target 21 may be a high speed flying object such as a missile or an aircraft. In the drawings, a missile is shown.

The transmitting antenna 7 is connected to the micro power module 6 and to the series circuit of the phase shifter 5 in series, respectively. To the phase shifters 5, signals distributed by the signal distributor 4 are inputted in parallel, respectively. The phase shifters 5 output transmitting signals to the transmitting antennas 7 while adjusting the beam widths and the beam directions thereof, respectively. Therefore, as shown in FIG. 2, the transmitting antennas 7 transmit the transmitting signals to the target 21 while switching to a broad beam B1 having a wide beam width from a synthesized aperture formed by combining the antennas 7, or to a pencil beam B2 in which the beam width from the synthesized aperture is concentrated in the direction of the specific target 21. Here, the broad beam B1 is outputted in the ranging mode and in the MTI mode, and is a beam for emitting transmitting signals to the all view angles of receiving antennas, described later, with uniform power. The pencil beam B2 is outputted when attention is focused on the specific target 21 so as to observe it with a S/N ratio as high as possible, and at the time of the ISAR monitoring mode, and is a beam in which transmitting signals are emitted toward a specific direction to which the whole transmitting power is concentrated.

The clock generation unit 1 outputs clocks to the signal generation unit 2 and the receivers R and other respective units. The signal generation unit 2, to which clocks are inputted from the clock generation unit 1, outputs CW (continuous wave) signals at the time of the MTI mode, and outputs FMCW (frequency-modulated continuous wave) signals at the time of the ranging mode and the ISAR mode. CW signals are signals which are outputted continuously with the frequency being not modulated, and FMCW signals are signals which are outputted continuously with the frequency being modulated linearly.

Figure 3:
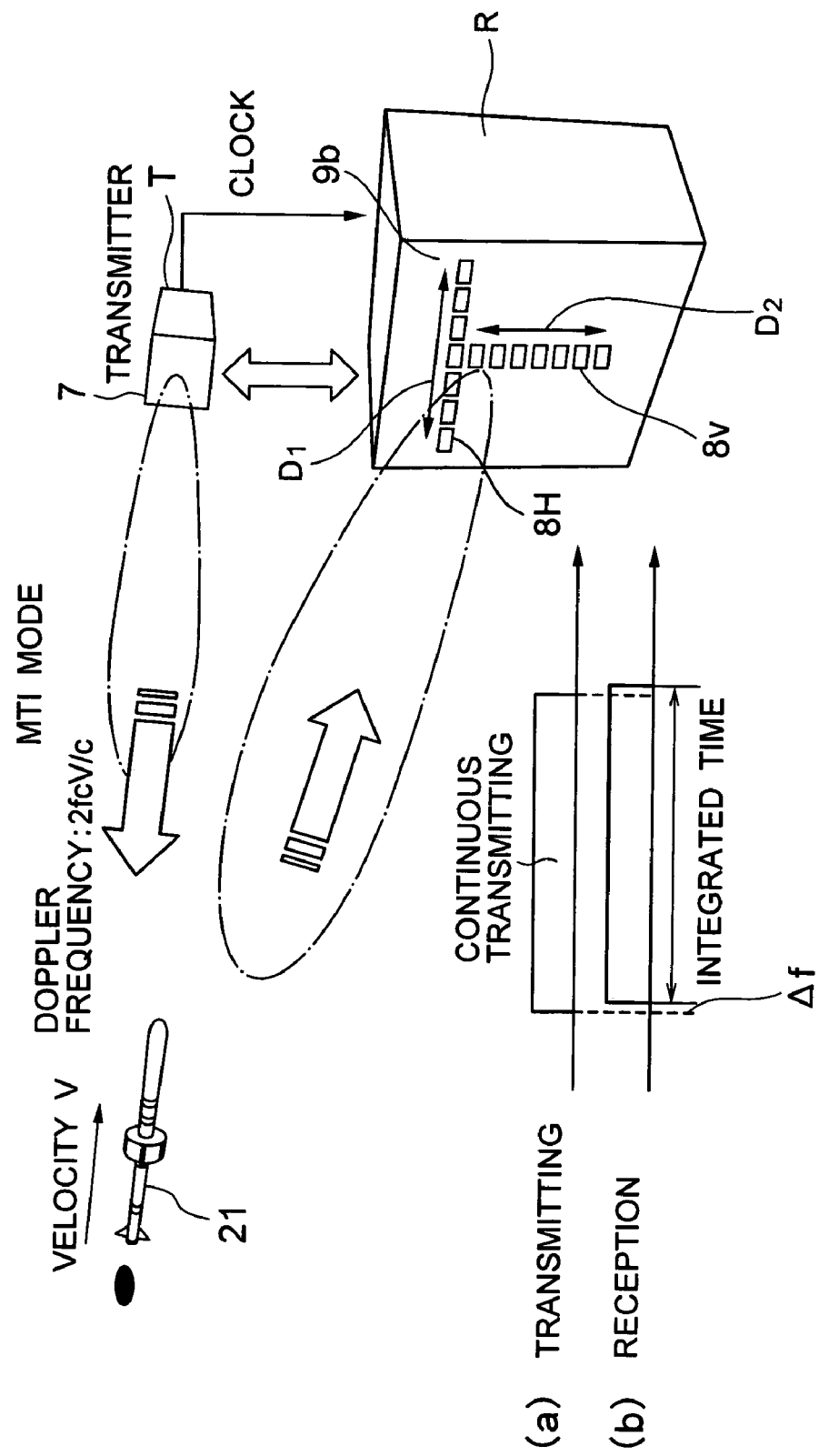
FIG. 3 is a diagram showing the configuration of receiving antennas installed in a receiver of the interferometer-type radar according to the present invention, and showing the time of operating in an MTI mode.

As shown in FIG. 1, the receiver R includes a plurality of receiving antennas $8_H$ and $8_v$ of an H (horizontal) system and a V (vertical) system. As shown in FIG. 3, the receiving antennas $8_H$ and $8_v$ of the H system and the V system are aligned in a T shape on an antennal face 9b. That is, as shown in FIG. 3, the receiving antennas $8_H$ of the H system are aligned linearly in a horizontal direction (right and left direction in the drawing) of the antenna face 9b, and the receiving antennas 8V of the V system are aligned linearly in an vertical direction (up and down direction of the drawing) of the antenna face 9b, to thereby form the T shape. In this case, the efficiency becomes optimum when the row of the V-system receiving antennas extends downward from the central position of the row of the H-system receiving antennas. However, the alignment of the antennas is not limited to this configuration. No problem will be caused even if the row of the V-system receiving antennas extends downward from a position shifted to right or left from the central position so as to form a T shape, although the efficiency is slightly reduced. The antenna face 9b is in a plane shape in which the normal direction faces to a direction to be observed. As the receiving antennas $8_H$ and $8_v$, microwave (e.g., X-band) receiving antennas are used. In FIG. 3, the spatial resolution is determined by the length D1 of the row of the H-system receiving antennas $8_H$ aligned in a horizontal direction, and the length D2 of the row of the V-system receiving antenna $8_v$ aligned in a vertical direction. As the dimensions of the lengths D1 and D2 of the antenna rows are larger, the spatial resolution becomes larger.

In the relationship between the transmitting antennas 7 and the receiving antennas 8 ($8_H$, $8_v$), the antenna pattern and the beam width of the transmitting antenna 7, at the time of normal observation, are selected to be in the broad beam mode B1 such that the reflection signals from the target 21 are emitted to the whole view angle of the receiving antennas 8 uniformly.

As shown in FIG. 1, the receiving antennas 8 ($8_H$, $8_v$) have almost the same electrical specifications, respectively. Each of the receiving device includes a low noise amplifier (LNA) 10, a frequency converter 11, a pair of lowpass filters 12a and 12b, an A/D converter 13, an FFT processor 14, a correlation processor (a correlator 15a and an integrator 15b) 15, a two-dimensional FFT processor 16, a data processor 17, an image display unit 18, and a high accuracy ranging processor 19.

The low noise amplifier 10 amplifies receiving signals outputted from the receiving antenna 8. The frequency converter 11 performs, by using signals outputted from the signal generation unit 2, frequency-conversion with respect to the receiving signals received by the receiving antennas 8 by system, that is, the H-system receiving antennas $8_H$ and the V-system receiving antennas $8_v$, demodulates the receiving signals, extracts an IQ signal (analog signal), which is a complex signal, from each receiving signal, and outputs an I signal thereof to the one lowpass filer 12a, and outputs a Q signal thereof to the other lowpass filter 12b, respectively. The lowpass filters 12a and 12b remove high frequency components of the IQ signal. The A/D converter 13 synchronizes the analog IQ signal (receiving signal), in which high-frequency components are removed in the lowpass filters 12a and 12b, with the clock from the clock generation unit 1, and A/D-converts it to a digital signal. The FFT processor 14 performs, in parallel, conversion relating to discrete Fourier transformation for the digital signals from the A/D converter 13, which are received by the receiving antennas 8 of the H system and the V system and demodulated (FFT), and outputs the output signals to the correlation processor 15 and the high-accuracy ranging processor 19.

The correlation processor 15, having the correlator 15a and the integrator 15b, performs correlation integration to the output signals from the FFT processor 14 between signals of the H system and the V system of the receiving antennas 8. The two-dimensional FFT processor 16, to which the signals performed with the correlation integration in the correlation processor 15 are inputted, performs processing to calculate the direction of the radio wave source (target 21) from the phase fronts of the signals inputted into the antenna faces (antenna faces of the receiving antennas) 9b by velocity of the target 21. The data processor 17, to which data performed with the two-dimensional FFT processing in the two-dimensional FFT processor 16 is inputted by using the clocks outputted from the clock generation unit 21, outputs the direction of the target classified by velocity of the target in the MTI mode and the direction of the target classified by distance of the target in the ranging mode to the image display unit 18, and also outputs data of the velocity and the direction of the target to the high-accuracy ranging processor 19.

In the embodiment of the present invention, transmitting from the transmitting antennas 7 and reception by the receiving antennas 8 are performed at the same time. Therefore, as shown in FIG. 3, the transmitting antennas 7 and the receiving antennas 8 are installed with a certain distance so as not to interfere with each other as shown by the outline arrow such that transmitting signals from the transmitting antennas 7 do not come around to the receiving antennas 8.

The direction resolution in the embodiment of the present invention is determined by the distance between the receiving antennas 8 and 8 installed with the longest distance. Further, the observable view angle is determined by the beam width of each receiving antenna 8.

In the embodiment of the present invention, by changing the operation of the transmitter T and the receivers R, operation is performed in the MTI mode in which the direction and the velocity of the target are detected with extreme high sensitivity, and in the ranging mode in which the direction and the distance of the target are measured with the same high sensitivity. As shown in FIG. 1, the present invention includes a controller 20. The controller 20 has a function of controlling switching of the operation of the transmitter T and the receivers R between the two operational modes, that is, the MTI mode and the ranging mode, alternately within a range from several tens milliseconds to several seconds, synthesizing the outputted images, and displaying them as highly accurate ranging and MTI radar images. Further, in the MTI mode and the ranging mode, the controller 20 has a controlling function for controlling the operation of the data processor 17 and the high accuracy ranging processor 19, and performing velocity measurement and distance measurement with high accuracy relating to individual target.

First, operation in the MTI mode in the present invention will be explained. When an instruction of the MTI mode is inputted from the controller 20 to the transmitter T, the signal generation unit 2, to which clocks are inputted from the clock generation unit 1, continuously outputs CW signals (baseband signals) of a constant frequency, which are outputted to the signal distributor 4 through the exciter 3. The signal distributor 4 distributes the CW signals inputted and outputs them to the phase shifters 5. When the distributed signals are inputted to the phase shifter 5, it adjusts the beam width and the beam direction of transmitting signals transmitted from the transmitting antenna 7, and outputs the transmitting signals, which have been adjusted, to the transmitting antenna 7 via the micro power module 6. The transmitting antennas 7 emit continuing CW signals of a constant frequency shown in FIG. 3(a) to the target 21 as transmitting signals (transmitting signals). In this case, the transmitting waves of the CW signals are emitted from the transmitting antennas 7 to the target 21 in the pencil beam B2.

The controller 20 is a device for outputting an operational instruction of the MTI mode to the transmitter T and the receivers R at the same time, and when the transmitter T is transmitting transmitting signals (CW signals) to the target 21 as described above, the receivers R receive signals (receiving signals) reflected from the target 21. In this way, the transmitter T and the receivers R are operated at the same time, so if transmitting signals from the transmitter T come around to the receivers R as intense signals exceeding the linear operation area (range of small signals; linear range), the receivers R are difficult to distinguish the transmitting signals outputted from the transmitter T from the reflection signals from the target 21. Therefore, the transmitting antennas 7 and the receiving antennas 8 are installed with distances. If the power of the transmitting signals is in the linear operation area, unnecessary transmitting signals coming round from the transmitting antennas 7 to the receiving antennas 8 can be separated by the receivers and the FFT processing.

In FIG. 3, it is assumed that there is a target 21 flying at a high speed in an antenna beam direction of transmitting signals transmitted from the transmitting antennas 7. In this case, the transmitting signals from the transmitting antennas 7 are reflected from the target 21, and the reflection signals are received by the receiving antennas 8 as extremely weak receiving signals.

The receiving signals (reflection signals) received by the receiving antennas 8 are affected by a Doppler shift $\Delta f$ due to the velocity V of the target 21. Assuming that the transmitting frequency of the transmitting signals transmitted from the transmitting antennas 7 is $f_c$, the velocity of the target 21 is V, the Doppler shift is $\Delta f$, and the light velocity is C, their relationship will be shown as the following equation (1):

$$\Delta f = (2 \times V \times f_c)/C \quad (1)$$

The signals received by the receiving antennas 8 of the H system and the V system are amplified by the low noise amplifiers 10 respectively, and the amplified receiving signals are inputted into the frequency converters 11, respectively. Each frequency converter 11 performs frequency-conversion with the transmitting signals (transmitting signal transmitted from the transmitting antennas 7) from the signal generation unit 2 so as to convert them to signals of the baseband frequency (baseband signals).

When the A/D converter 13 receives the baseband signals from the frequency converters 11, the A/D converter 13 converts the baseband signals which are analog signals to digital signals, and outputs the baseband signals which are digital signals to the FFT processor 14.

Next, the FFT processor 14 classifies the inputted baseband signals by Doppler shift frequency (spectral analysis). At this time, DC frequency components included in the baseband signals are reflection signals from the target without a velocity and the come-around components from the transmitting antennas 7 to the receiving antennas 8, whereby they are removed by the A/D converter 13 and the FFT processor 14. In an example of an interferometer-type radar using the frequency of the X band, assuming that the maximum value in the range of the measurement object velocity is 7 Km/s, the maximum Doppler frequency is about 450 KHz. In this case, the A/D conversion frequency becomes more than twice as large as it, which is, 1 MHz for example. In the coarse MTI processing, assuming that the required velocity resolution is about 70 m/s, 256-point FFT is required. This output is correlation processed, integrated, performed with two-dimensional FFT processing, and made into the image of a screen for each velocity.

The FFT processing in the FFT processor 14 will be explained based on FIG. 6. Reflection signals, from the target 21 that the velocity component toward the receiving antennas 8 is V, are affected by a Doppler shift. By the Doppler shift frequency, signals from the target 21 are classified, and a target distribution map by velocity is obtained.

Figure 6:
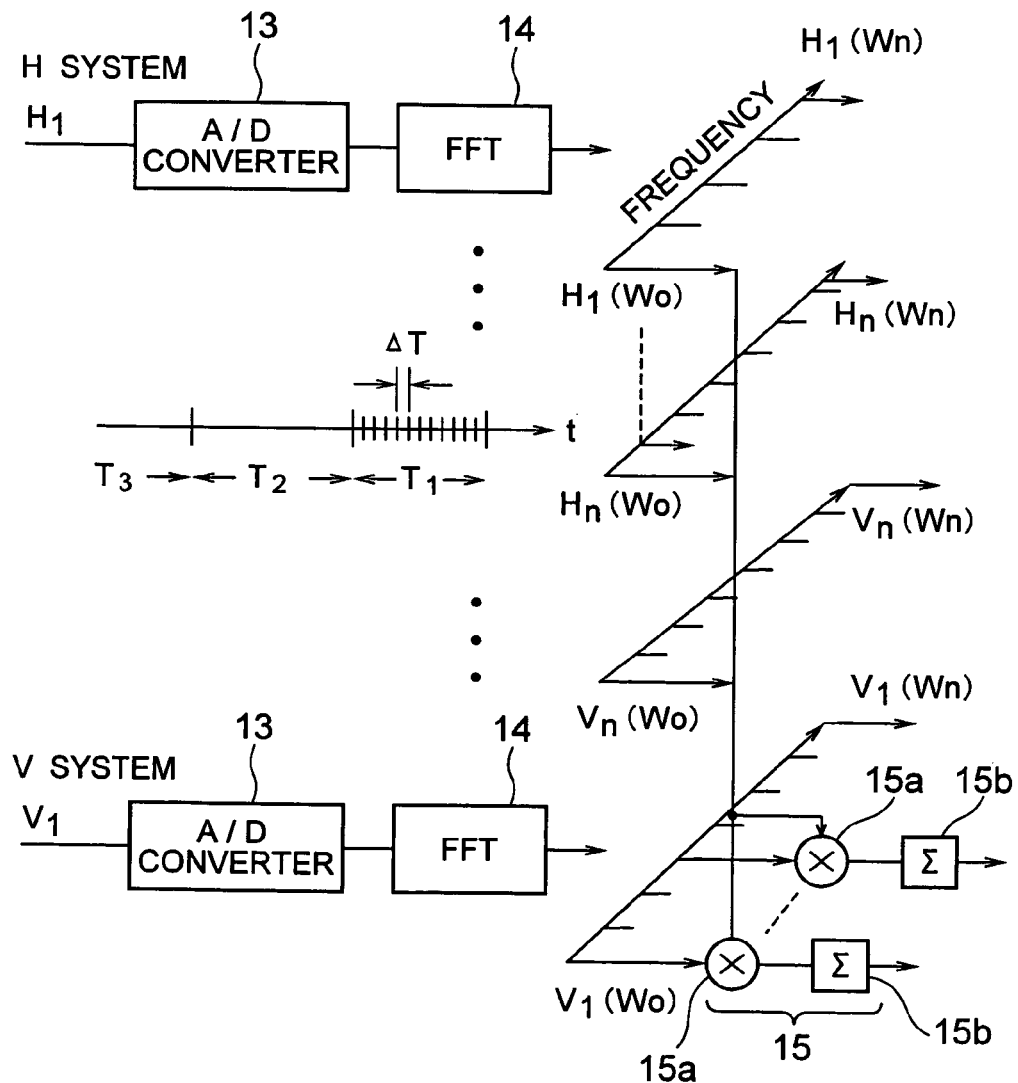
FIG. 6 is a diagram for explaining FFT processing and correlation processing in the present invention.

That is, as shown in FIG. 6, the FFT processor 14 frequency-analyzes the baseband signals which are digital signals A/D-converted by the A/D converter 13 by a certain cycle T1, T2, T3 . . . . In this case, the sample frequency Δt of the A/D conversion is required to be not less than two times the maximum Doppler frequency expected as shown in the following formula (2):

$$1/\Delta t > 2\Delta f_{max}$$

Here, $\Delta f_{max}$ is the maximum Doppler frequency expected.

Further, the data time T1, T2, T3 . . . for inputting and processing for once in the FFT processor 14 must be not less than the reciprocal time of the Doppler frequency of the required velocity resolution, as shown in the following formula (3):

$$T1, T2, T3 \ldots > 1/\Delta f_{min} \qquad (3)$$

Note that $\Delta f_{min} = 2\Delta V f_c/C$. Here, $\Delta V$ is a velocity resolution, and $\Delta f_{min}$ is a Doppler frequency resolution.

When the signals classified by Doppler shift frequency in the FFT processor 14 are inputted into the correlation processor (the correlator 15a and the integrator 15b), correlation integration processing is performed by the correlation processor 15. Next, explanation will be given for each of the correlation processing and the integration processing.

First, explanation will be given for a case where the correlator 15a performs correlation processing between signals of the systems of the receiving antennas 8. As shown in FIG. 6, when signals ($F(\omega_k)$) classified by the Doppler shift frequency by the FFT processor 14 are inputted into the correlator 15a, the correlator 15a performs correlation processing of the frequency components of signals $H_1^*(\omega_0) \sim H_1^*(\omega_n) \ldots H_n^*(\omega_0) \sim H_n^*(\omega_n)$, and signals $V_1(\omega_0) \sim V_1(\omega_n) \ldots V_n(\omega_0) \sim V_n(\omega_n)$ between the receiving antennas $\mathbf{8}_H$ and $\mathbf{8}_V$ of the H system and the V system. The correlation processing of the frequency components is performed between the receiving antennas $\mathbf{8}_H$ and $\mathbf{8}_V$ of all combinations between the H system and the V system. Through the correlation processing by the correlator 15a, phase differences by incident directions between signals received by the respective receiving antenna systems are detected, and by obtaining correlations between all receiving antennas 8, it is possible to obtain phase fronts, which are vector-synthesized, of all receiving signals made incident on the antenna face 9b.

The integrator 15b performs integration processing for a long time with respect to the signals which are correlation-processed by the correlator 15a (FIG. 3(b)). As a result of integration by the integrator 15b, receiver noises generated in the H system and the V system are suppressed, whereby extremely weak receiving signals not higher than the receiver noise level can be imaged. If common spurious signal exists within the receiver R at the same time, the spurious signal is extracted by the correlation integration processing between H and V systems. Therefore, as local signal generation of the receiver R for H and V system, independently generated local signals by a phased lock generator should be used. The DC components included in the baseband signals from the frequency converter 11 are removed by the A/D converter 13 and the FFT processor 14, whereby it is possible to remove an effect of transmitting signals from the transmitting antenna 7 being mixed in receiving signals of the receiving antennas.

Figure 7:
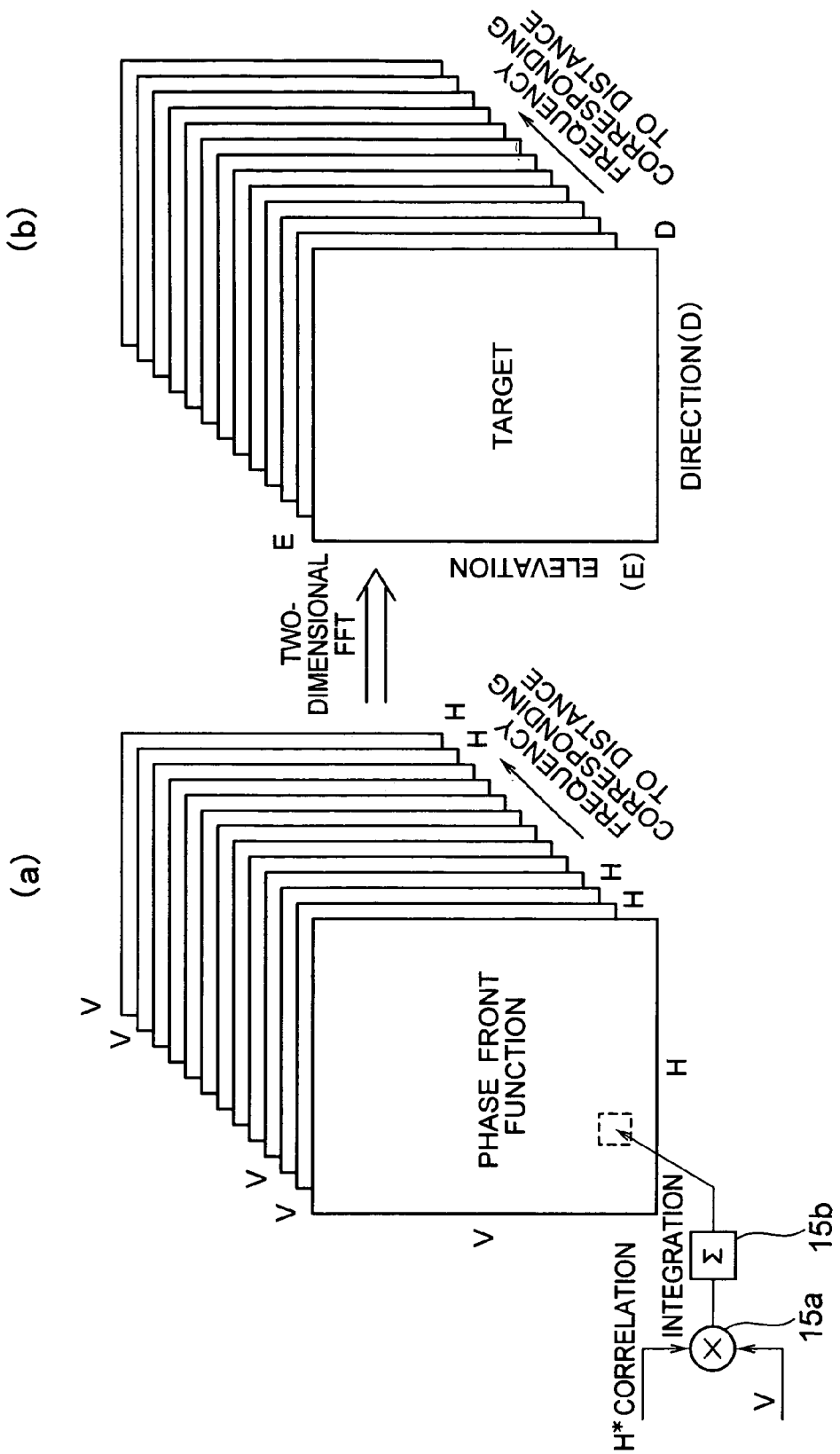
FIG. 7 is a diagram for explaining two-dimensional FFT processing.
Figure 8:
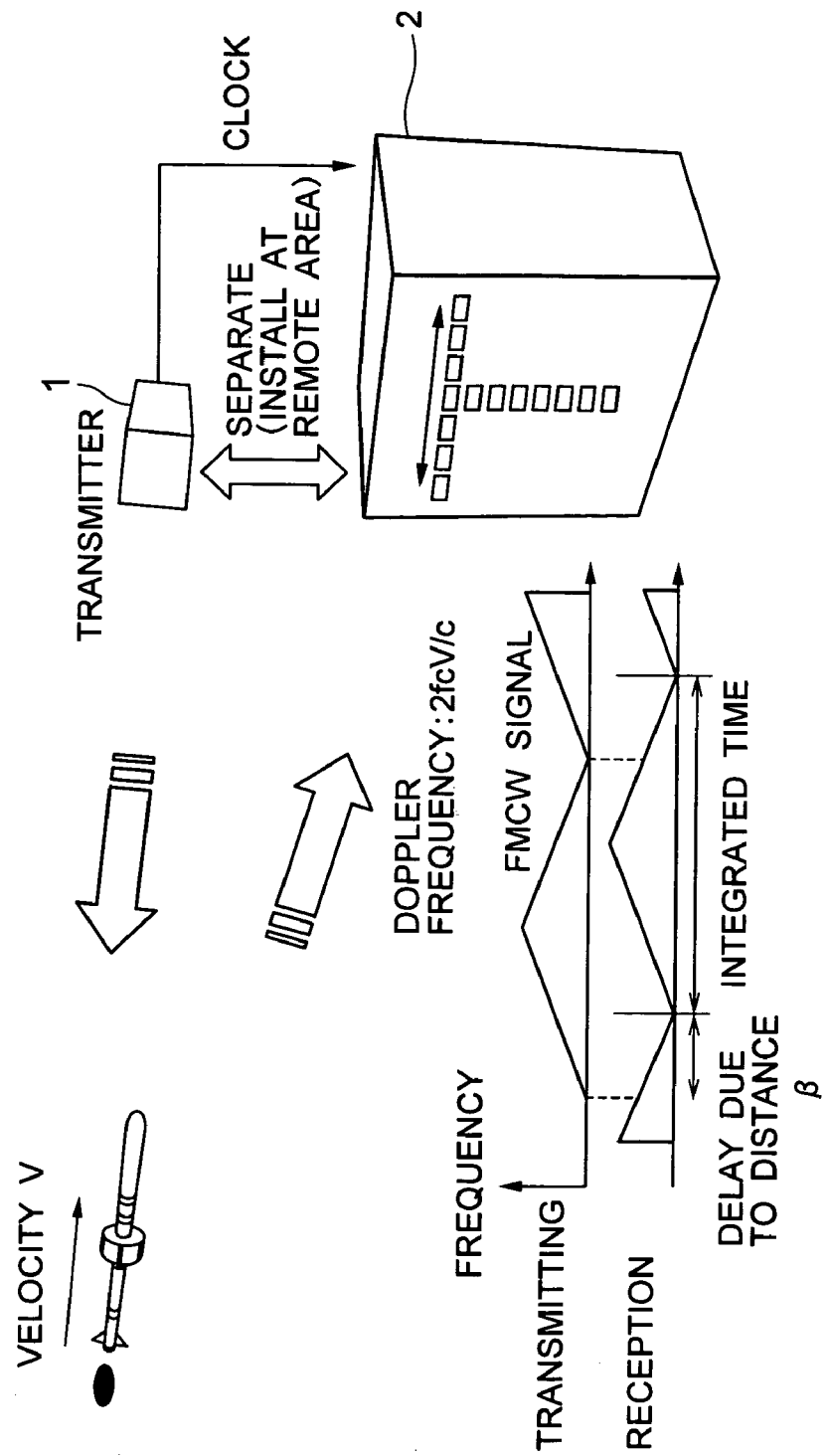
FIG. 8 is a diagram showing the configuration of receiving antennas installed in a receiver of the interferometer-type radar according to the present invention, and showing the time of operating in a ranging mode.

As described above, when the correlation calculation is performed by Doppler shift frequency for all combinations between the receiving antennas $\mathbf{8}_H$ and $\mathbf{8}_V$ of the H system and V system, a phase front (H-V) of the receiving signals (reflection signals from the target 21) inputted into the antenna face 9b is obtained for each Doppler shift frequency (velocity of the target 21) classified, as shown in FIG. 7(a).

When the two-dimensional FFT processor 16 receives signals from the correlation processor 15, it performs two-dimensional FFT processing to the two-dimensional functions of the phase fronts (H-V) shown in FIG. 7(a) to thereby obtain directions (D-E) of the target 21 classified by velocity as shown in FIG. (b).

Based on the directions (D-E) of the target 21 obtained in the coarse MTI processing described above, the data processor 17 measures the direction and velocity of the specific target 21. That is, as shown in FIG. 3(a), in the MTI mode, continuing CW signals are outputted from the transmitting side. The receiving signals are Doppler shifted by the velocity V of the target 21 and the Doppler shift Δf is detected as a Doppler frequency. Therefore, the data controller 17 calculates the velocity V of the target 21 from the equation (1). Since CW signals are used as transmitting signals in the present invention, it is possible to perform velocity analysis with very high accuracy. The inverse number of the required Doppler frequency resolution is a data time required for one frequency analysis processing. For example, when the transmitting frequency of the transmitting signal is 10 GHz, receiving data of 0.15 ms should be frequency-analyzed in order to obtain a velocity resolution of 100 m/s.

Further, in the data processor 17, signal intensities from the target 21 for respective directions (D-E) outputted from the two-dimensional FFT processor 16 are integrated for a certain time. In a case of outputting a surveillance image of the target in which the direction within a certain time period seems constant, it is possible to perform integration within the time, further, to improve the S/N ratio. Therefore, it is possible to image a target which cannot be detected by conventional radar.

Next, operation in the ranging mode in the present invention will be explained. In the ranging mode, FMCW signals are outputted instead of CW signals outputted in the MTI mode. In the ranging mode, the configuration is the same as that of the MTI mode and the transmitting signals are FMCW, whereby it is possible to measure the distance to the target.

In the ranging mode, the receiving signals are frequency-converted with FMCW signals which are the same as the transmitting signals, whereby the distance to the target 21 is converted to the frequency of the reflection signals (receiving signals).

Therefore, when the correlation processor 15 performs correlation calculation by frequency for all combinations between the receiving antennas $\mathbf{8}_H$ and $\mathbf{8}_V$ of the H system and the V system, it is possible to obtain phase fronts (H-V) of receiving signals (reflection signals from the target 21) inputted into the antenna face 9b for respective frequencies (distances to the target 21) classified by distance to the target 21, as shown in FIG. 7(a). FIG. 7(a) shows a plurality of phase fronts (H-V) classified by frequency corresponding to the distances to the target 21.

When the two-dimensional FFT processor 16 receives signals from the correlation processor 15, it performs two-dimensional FFT processing of the two-dimensional functions of the phase fronts (H-V) shown in FIG. 7(a) to thereby obtain directions (D-E) of the target 21 classified by distance to the target 21, as shown in FIG. 7(b). In the coarse processing, if the target 21 has the velocity, the frequency shifts a little more comparing with a case where it remains stationary, but it is possible to suppress it within the tolerance of the distance resolution. In the example of the interferometer-type radar of the X band, assuming that the maximum observable range is 3000 Km, the repetition cycle of the FMCW signal is about 20 ms, and assuming that the maximum distance resolution is 1 m, the FMCW transmitting signal bandwidth is 150 MHz. Since the maximum Doppler frequency shift of the target 21 is about 450 KHz, if the distance resolution is 20 Km in the coarse processing, the tolerance due to the Doppler frequency shift can be disregarded.

In the coarse processing, after receiving signals of the receiving antennas 8 are classified by frequency in the FFT processing performed by the FFT processor 14, correlation processing and integration are performed the same as the case of MTI mode so as to improve the S/N ratio. Irrespective of the number of targets within the view angle, it is possible to trace the loci of the respective targets by the data processor 17 (without degrading the performance). Unless the direction of the target 21 with respect to the receiving antennas 8, the distance to the target 21 and the velocity of the target 21 change significantly (when they are in a tolerance range), the correlation output phase of signals reflected from the target 21 is constant, whereby the phase integration is performed for plural pulses so as to improve the sensitivity and the accuracy. By removing low frequency components near DC components after converting to baseband signals as same as the case of ranging mode, the come-around components of transmitting signals to the receiving antennas 8 can be removed.

Further, the data processor 17 analyzes the signal intensity for each direction (D-E) outputted from the two-dimensional FFT processor 16 shown in FIG. 7(b), and for each distance to the target 21 calculated, detects the direction of the target 21 from the coordinates within the direction (D-E).

The controller 20 switches the operation of the transmitter T and the receivers R between the MTI mode and the ranging mode within a range from several tens milliseconds to several seconds, alternatively.

Figure 9:
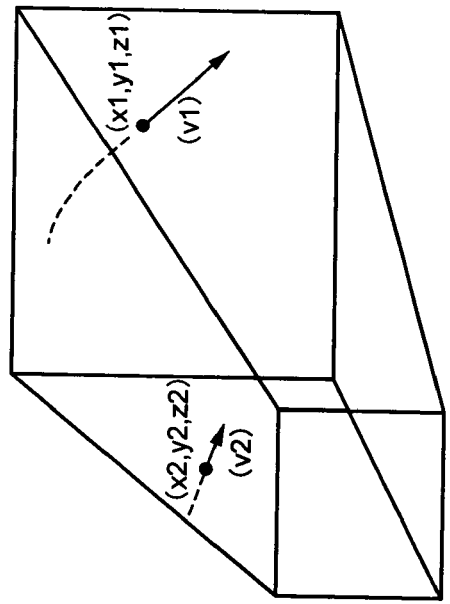
FIGS. 9(a) and (b) are diagrams showing display examples for displaying images in the present invention.

When the image display unit 18 receives data from the data processor 17 in the MTI mode, it synthesizes data of the velocity and the direction of the target 21 classified by Doppler frequency, and synthesize-displays the direction and the velocity of the target 21 existing in the whole view angle. Further, when receiving data from the data processor 17 in the ranging mode, the image display unit 18 synthesizes data of the distance and direction of the target 21 classified by baseband frequency corresponding to the distance, and synthesize-displays the direction and distance of the targets 21 existing in the whole view angle. Accordingly, as shown in FIG. 9(a), positional information of the target ($x_1$, $y_1$, $z_1$ and $x_2$, $y_2$, $z_2$) are displayed in three dimensions (3D) within the beam B3 of the receiving antennas 8. The velocity and traveling direction information of the target 21 is displayed in vector. Further, the tracking information of the target 21 is displayed in broken lines.

Although the coarse MTI mode and the coarse ranging mode described above are in the case where the direction, velocity and distance of the target existing in the whole view angle by the receiving antennas are synthesized and displayed, there is a case where accuracy ranging, tracking and displaying of expected tracking of the specific target 21 are performed, or displaying of an ISAR image as shown in FIG. 9(b) is performed. In such a case, it is required to improve frequency the distance resolution, that is, to identify the position and time, by correcting the frequency $\Delta f$ on the basis of the velocity information of the target 21 obtained in the MTI mode. This processing is performed by the high-accuracy ranging processor 19 in FIG. 1.

Next, processing performed by the high accuracy ranging processor 19 will be explained. As shown in FIG. 4(a), when the frequency difference between the transmitting signal and receiving signal of stopping target 21 is obtained by the frequency converter 11, the distance to the target 21 is converted to the frequency of the receiving signal. In this case, since the target 21 is stopping, a change in the frequency due to the distance change is not caused. The delay time $T_d$ of the receiving signal with respect to the transmitting signal will be explained in the following equation (4):

$$T_d = 2R/C = 2(R_0 - Vt)/C \quad (4)$$

$R(R_0)$ is the distance from the receiving antenna 8 to the target 21, C is light velocity, and V is the velocity of the target 21.

Here, as data of the distance R to the target 21, the distance information obtained in the ranging mode is used. Further, as data of the velocity of the target 21, the velocity information obtained in the MTI mode is used.

FIG. 4(b) shows the relationship between a change in the baseband frequency which is frequency-converted by the frequency converter 11 and a time (change in distance to the target 21). In FIG. 4(b), the lines L indicated by the dotted lines show repetition frequency by the sample of FMCW signals. Further in FIG. 4(b), the baseband frequency $f_B$ frequency-converted by the frequency converter 11 is shown by the following equation (5):

$$f_B = 2kR_0/C \quad (5)$$

k is a chirp rate, and assuming that the pulse width of the transmitting signal is $\tau$ and the band width of the transmitting signal is B, $k = B/\tau$.

In the case of FIG. 4(a), the target 21 is stopped, so the baseband frequency $f_B$ does not change depending on the distance to the target 21. When the Doppler shift $\Delta f$ of the receiving signal with respect to the transmitting signal is turned around, the baseband frequency $f_B$ becomes constant.

Accordingly, energy of the baseband signals (receiving signals) classified by frequency corresponding to the distance, which is frequency-converted by the frequency converter 11, becomes to be in a sharp-pointed shape as shown in FIG. 4(c).

On the other hand, a case where the target 21 approaches the receiving antenna 8 at a high speed as shown in FIGS. 5(a), 5(b) and 5(c) will be explained. In FIG. 5(a), when the difference between the transmitting signal and the receiving signal is obtained and frequency-converted by the frequency converter 11, it is shown as FIG. 5(b). As shown in FIG. 5(b), when the target 21 moves at a high speed (constant velocity), the baseband frequency $f_B$ changes by a one-dimensional formula of t. That is, the baseband frequency $f_B$ is affected by the Doppler frequency to thereby cause a frequency change by the distance. The frequency change y is shown by the following equation (6):

$$y = \{-2kVt + 2(kR_0 - Vf_c)/C \quad (6)$$

Here, the Doppler frequency $f_d = 2Vf_c/C$.

As shown in FIG. 5(c), the energy of the baseband signals (receiving signals) expands, comparing with the case of FIG.

4(c), and the sensitivity is reduced, and the distance resolution is degraded. Therefore, it is required to perform velocity correction processing by the high-accuracy ranging processor 19 so as to perform distance measurement with high accuracy. Next, processing of distance measurement with high accuracy performed by the high-accuracy ranging processor 19 will be explained.

The high-accuracy ranging processor 19 obtains positioning information of the target to be processed with high accuracy and velocity distant data of the coarse processing result from the data processor 17. After obtaining the data, the high-accuracy ranging processor 19 only extracts baseband signals $f_B$ in the direction obtained from the information inputted from the data processor 17, among the output signals of the FFT processor 14 corresponding to the Doppler frequency of the target obtained in the coarse MTI processing.

To the extracted baseband signal $f_B$, a correction term of the frequency change y due to the distance change to the target 21 is added. The baseband signal $f_{out}$, to which the correction term of the frequency change is added, is shown by the next equation (7):

$$f_{out} = f_B + 2kVt/C = 2(kR_0 - Vf_c)/C \qquad (7)$$

When the equation (7) is rewritten to an equation representing the distance $R_0$, the following equation (8) will be obtained:

$$R_0 = (f_{out}C/2 + Vf_c)/k \qquad (8)$$

After calculating the equation (7), the high-accuracy ranging processor 19 performs velocity measurement with high accuracy through frequency analysis with high accuracy for the baseband signal $f_{out}$ to which the correction term of the frequency change is added.

Next, the high-accuracy ranging processor 19 performs high accuracy ranging processing by using velocity data measured with high accuracy. That is, the high accuracy ranging processor 19 selects the output frequency of the FFT processor 14 in which the target information is included from the distance information obtained in the coarse ranging mode, and obtains signals for the all receiving antenna systems. Then, the high-accuracy ranging processor 19 synthesizes the signals of the all receiving antenna systems with phase delay such that only the target directions obtained in the coarse processing are made intense to each other, to thereby only extract signal direction components of the target. Then, the high-accuracy ranging processor 19 performs distance correction and Doppler correction for an integral time by using the velocity data obtained with high accuracy to the extracted signals, and then performs frequency analysis with high accuracy. Thereby, the high-accuracy ranging processor 19 outputs accurate distance information of the specific target to the image display unit 18.

Based on the distance information from the high-accuracy ranging processor 19, the image display unit 18 displays accurate ranging, tracking and an expected locus of the specific target. In the ISAR mode, an ISAR image as shown in FIG. 11(b) is displayed. Further, the accuracy ranging mode is used together with the ranging mode, and the display unit 18 displays the accuracy distance of the specific target together with a time stamp of the measurement time. In this case, the data processor 17 performs estimation of the orbit of the target based on the distance information from the high-accuracy ranging processor 19.

Although, in the embodiment described above, a clock from the clock generation unit 1 is used as a reference signal, a reference signal is not limited to a clock. That is, the FMCW radar according to the present invention may be changed to have a configuration including: a transmitter T for transmitting signals which are changed by a constant frequency change rate (chirp rate) k and repeated in a cycle T; a receiver R having a heterodyne function in which signals reflected from a target are frequency-converted with local origination signals, of frequency change rate k, of a timing completely same as transmitting signals or a timing which is phase-synthesized; and an A/D converter for digitizing with a sample frequency F (F=kT) which is the product of the k and T.

With this configuration, in the FMCW radar in which repetition frequency of FMWC is set to be high and the frequency is changed in wideband, in order to process receiving signal energy of reflection signals at long distance effectively, by performing A/D conversion which is equivalent to the product of the repetition cycle and the frequency change rate, receiving signal components far exceeding one cycle are changed to be the same frequency by the turnaround characteristics of the digital signals, whereby all receiving signal energies are processed effectively.

INDUSTRIAL APPLICABILITY

As described above, according to the present invention, transmitting signals are not pulses but CW or FMCW signals, different from general radars. Thereby, it is possible to use transmitting modules for general communications, not for radars.

What is claimed is:

1. An interferometer-type radar comprising:
   a transmitter for transmitting a signal to a target; and
   a receiver for receiving a reflection signal reflected from the target, wherein
      the transmitter includes a function of outputting a continuous wave (CW) signal for detecting direction and velocity of the target from a transmitting antenna, and
      the receiver includes:
         a function of receiving a reflection signal reflected from the target with a plurality of receiving antennas at a same time as transmitting from the transmitter, performing spectral analysis with respect to receiving signals, and classifying the receiving signals by velocity component;
         a function of performing correlation processing between signals of receiving antenna systems;
         a function of integrating signals which have been correlation-processed; and
         a function of performing two-dimensional fast fourier transform (FFT) to an output which has been integration-processed, and measuring an a direction and the velocity of the target.

2. An interferometer-type radar comprising:
   a transmitter for transmitting a signal to a target; and
   a receiver for receiving a reflection signal reflected from the target,
   wherein the transmitter includes a function of outputting a frequency-modulated continuous wave (FMCW) signal for detecting velocity of the target from a transmitting antenna, and
   the receiver has includes:
      a function of receiving a reflection signal reflected from the target with a plurality of receiving antennas at a same time as transmitting from the transmitter, performing spectral analysis with respect to receiving signals which are frequency-converted with a signal same as a transmitting signal of FMCW, and classifying the receiving signals by distance component;

a function of performing correlation processing between signals of receiving antenna systems;

a function of integrating signals which have been correlation-processed; and a function of performing two-dimensional FFT to an output which has been integration-processed and measuring the direction and the velocity of the target.

3. The integration-type radar, as claimed in claim 2, wherein the receiver further includes:

a function of receiving a reflection signal reflected from the target with a plurality of receiving antennas at a same time as transmitting from the transmitter, and performing frequency-correction, in which a Doppler shift caused by a velocity component and a positional change are corrected, to receiving signals which are frequency-converted with a signal same as the transmitting signal of FMCW by using velocity data of a specific target for which ranging is to be performed;

a function of performing spectral analysis in detail with respect to the signals which are frequency-corrected, and obtaining with high accuracy distance information which is converted to a frequency.

4. The interferometer-type radar, as claimed in claim 2, wherein the transmitter transmits an FMCW transmitting signal, which is phase-synchronized with a reference signal generated, from the transmitting antenna, and outputs the reference signal to the receiver, and the receiver performs, by using the reference signal outputted from the transmitter as a common signal, frequency conversion and inverse synthetic aperture radar (ISAR) processing with respect to the reflection signal.

5. The interferometer-type radar, as claimed in claim 1, wherein in the transmitter, a plurality of transmitting antennas connected to a plurality of transmitting modules are aligned in a matrix, and a transmitting signal, in which a beam width and a beam direction thereof are adjusted by a phase shifter of the transmitting module, is outputted from the transmitter.

6. The interferometer-type radar, as claimed in claim 2, wherein in the transmitter, a plurality of transmitting antennas connected to a plurality of transmitting modules are aligned in a matrix, and a transmitting signal, in which a beam width and a beam direction thereof are adjusted by a phase shifter of the transmitting module, is outputted from the transmitter.

7. The interferometer-type radar, as claimed in claim 1, wherein in the receiver, a plurality of receiving antennas are aligned in a T shape on an antenna face, and a space resolution is expanded by a dimension of the T shape.

8. The interferometer-type radar, as claimed in claim 2, wherein in the receiver, a plurality of receiving antennas are aligned in a T shape on an antenna face, and a spatial resolution is expanded by a dimension of the T shape.

9. The interferometer-type radar, as claimed in claim 1, further comprising an image display unit, wherein the image display unit images outputted images from the receiver by overlapping them to thereby display direction, distance and velocity of the target, high-accuracy distance to the target at an instant time, and an ISAR image of the target by combining them.

10. The interferometer-type radar, as claimed in claim 2, further comprising an image display unit, wherein the image display unit images outputted images from the receiver by overlapping them to thereby display direction, 5 distance and velocity of the target, high-accuracy distance to the target at an instant time, and an ISAR image of the target by combining them.

11. An interferometer-type radar comprising:

a transmitter for transmitting a signal which is changed by a constant frequency change rate k and repeated in a cycle T;

a receiver having a heterodyne function in which a signal reflected from a target is frequency-converted with a local origination signal, having one of a timing completely same as said transmitting signal, a timing which is phase-synchronized, which is changed by a frequency change rate k and repeated in a cycle T; and an analog-to-digital (A/D) converter for digitizing with a sample frequency F (F=kT) which is a product of the k and T.

* * * * *